(12) United States Patent
Coss, Jr.

(10) Patent No.: US 7,783,455 B1
(45) Date of Patent: Aug. 24, 2010

(54) METHODS AND SYSTEMS FOR ANALYZING PROCESS EQUIPMENT PROCESSING VARIATIONS USING SENSOR DATA

(75) Inventor: Elfido Coss, Jr., Austin, TX (US)

(73) Assignee: GlobalFoundries Inc., Austin, TX (US)

( * ) Notice: Subject to any disclaimer, the term of this patent is extended or adjusted under 35 U.S.C. 154(b) by 228 days.

(21) Appl. No.: 11/072,140

(22) Filed: Mar. 4, 2005

(51) Int. Cl.
*G06F 11/14* (2006.01)

(52) U.S. Cl. .............. 702/183; 702/182; 702/185; 702/58; 700/95; 700/108; 714/48

(58) Field of Classification Search ............ 702/183, 702/185, 188; 438/7–11, 14–17; 700/121
See application file for complete search history.

(56) References Cited

U.S. PATENT DOCUMENTS

| | | | | |
|---|---|---|---|---|
| 6,303,397 B1* | 10/2001 | Chen et al. | .............. | 438/14 |
| 6,441,620 B1* | 8/2002 | Scanlan et al. | .............. | 324/459 |
| 6,458,610 B1* | 10/2002 | Lensing et al. | .............. | 438/16 |
| 6,535,785 B2* | 3/2003 | Johnson et al. | .............. | 700/121 |
| 6,905,895 B1* | 6/2005 | Coss et al. | .............. | 438/16 |
| 6,959,255 B2* | 10/2005 | Ye et al. | .............. | 702/117 |
| 7,117,062 B1* | 10/2006 | Sonderman et al. | .............. | 700/121 |
| 7,333,871 B2* | 2/2008 | Schwarm | .............. | 700/108 |
| 2002/0182878 A1* | 12/2002 | Hirose et al. | .............. | 438/710 |
| 2003/0014145 A1* | 1/2003 | Reiss et al. | .............. | 700/121 |
| 2004/0083021 A1* | 4/2004 | Somekh et al. | .............. | 700/121 |
| 2004/0123182 A1* | 6/2004 | Cross et al. | .............. | 714/25 |
| 2004/0173599 A1* | 9/2004 | Velichko et al. | .............. | 219/494 |
| 2005/0071034 A1* | 3/2005 | Mitrovic | .............. | 700/121 |

* cited by examiner

*Primary Examiner*—Hal D Wachsman
*Assistant Examiner*—Mi'schita' Henson
(74) *Attorney, Agent, or Firm*—Williams, Morgan & Amerson (57) ABSTRACT

The present invention is generally directed to various methods and systems for isolating process equipment using sensor data. In one illustrative embodiment, the method includes providing at least two processing tools wherein the tools produce different process results when performing a target process operation, acquiring support facility data using a plurality of sensors, and analyzing the acquired support facility data to determine a cause for the processing tools producing different process results.

23 Claims, 4 Drawing Sheets

METHODS AND SYSTEMS FOR ANALYZING PROCESS EQUIPMENT PROCESSING VARIATIONS USING SENSOR DATA

BACKGROUND OF THE INVENTION

1. Field of the Invention

This invention relates generally to fault detection systems, and, more particularly, to methods and systems for analyzing process equipment processing variations using sensor data.

2. Description of the Related Art

After a complete reading of the present application, those skilled in the relevant art will understand that the present invention has broad application to a variety of industries involving the manufacture of a variety of different types of devices or workpieces. By way of example only, the background of the application will be discussed in the context of various problems encountered in the manufacture of integrated circuit devices. However, the present invention is not to be considered as limited to use only within the semiconductor manufacturing industry.

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a group (lot) of wafers using a variety of process tools, including photolithography steppers, etch tools, deposition tools, polishing tools, thermal anneal process tools, implantation tools, etc. The technologies underlying semiconductor process tools have attracted increased attention over the last several years, resulting in substantial refinements. However, despite the advances made in this area, many of the process tools that are currently commercially available suffer certain deficiencies. In particular, some of such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various process tools. The manufacturing tools communicate with a manufacturing framework or a network of processing modules. Each manufacturing tool is generally connected to an equipment interface. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Target values for the various processes performed are generally based on design values for the devices being fabricated. For example, a particular process layer may have a target thickness. Operating recipes for deposition tools and/or polishing tools may be automatically controlled to reduce variation about the target thickness. In another example, the critical dimensions of a transistor gate electrode may have an associated target value. The operating recipes of photolithography tools and/or etch tools may be automatically controlled to achieve the target critical dimensions.

Typically, a control model is used to generate control actions for changing the operating recipe settings for a tool being controlled based on feedback or feedforward metrology data collected related to the processing by the tool. To function effectively, a control model must be provided with metrology data in a timely manner and at a quantity sufficient to maintain its ability to predict the future operation of the tool it controls.

Within many manufacturing industries great effort is made to insure that processing operations are performed accurately such that the resulting device meets target specifications. This is particularly true within the semiconductor manufacturing industry wherein many metrology tools and sensors are used to acquire a vast amount of metrology data to determine the effectiveness and accuracy of the processing operations performed in a tool and/or the compliance of the resulting workpiece with product specifications. Additionally, modern semiconductor manufacturing involves the use of various fault detection control routines and schemes to determine when a process operation or a particular tool is producing unacceptable results.

In one particularly illustrative example, in semiconductor manufacturing environments, it is desirable to be able to perform a desired process operation, e.g., a deposition process, on one of a plurality of such tools capable of performing the desired process operation. In general, having multiple tools available to perform a desired processing operation provides a greater manufacturing flexibility as it relates to producing the finished products. Such flexibility can increase the overall productivity and efficiency of the manufacturing facility.

To that end, it is sometimes assumed that performing a target process operation, i.e., a specific deposition recipe in each of a plurality of different process tools adapted to perform that function, will produce the same or very similar results, i.e., results within acceptable limits. In fact, in many cases, tool state data, e.g., temperatures, fluid or gas flows and flow rates, pressure, etc., is monitored for each of the plurality of process tools in an effort to insure that each of the individual process tools is individually capable of producing the desired finished product within product specifications. However, in practice, in performing a particular process operation, different process tools may produce very different results, even though the tool state data indicates that the tools should be producing similar results. As a more specific illustrative example, in performing a target deposition process operation that is intended to produce a 100 Å thick layer of silicon dioxide, a first deposition tool may form the layer to exactly 100 Å, with a surface planarity of approximately 95%, whereas a second deposition tool (performing the same deposition process recipe) may produce a layer of silicon dioxide having a thickness of 92 Å and a surface planarity of approximately 85%, while yet a third deposition tool (again performing the same deposition process recipe) may produce a layer having a thickness of approximately 89 Å and a surface planarity of approximately 80%. Such variations may occur even though the monitored tool state data indicates that each of the individual process tools should produce similar results. Such a phenomenon is sometimes referred to as a mismatch between process chambers or tools.

Confronted with such a situation, a manager of a semiconductor manufacturing facility does not, in fact, have several equivalent options for forming the layer of material. That is, in such a situation, the manufacturing flexibility of the facility is greatly reduced which may tend to reduce manufacturing efficiencies and product yields. When such situations occur, great efforts are made to determine the cause of such chamber mismatching as it can dramatically reduce manufacturing efficiencies and yields.

The present invention is directed to overcoming, or at least reducing the effects of, one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is generally directed to various methods and systems for analyzing process equipment processing variations using sensor data. In one illustrative embodiment, the method comprises providing at least two processing tools wherein the tools produce different process results when performing a target process operation, acquiring support facility data using a plurality of sensors, and analyzing the acquired support facility data to determine a cause for the processing tools producing different process results.

In another illustrative embodiment, the method comprises providing at least two processing tools wherein the tools produce different process results when performing a target process operation, acquiring support facility data using a plurality of sensors, and providing a controller that accesses the acquired support facility data and analyzes the acquired support facility data to determine a cause for the processing tools producing different process results.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
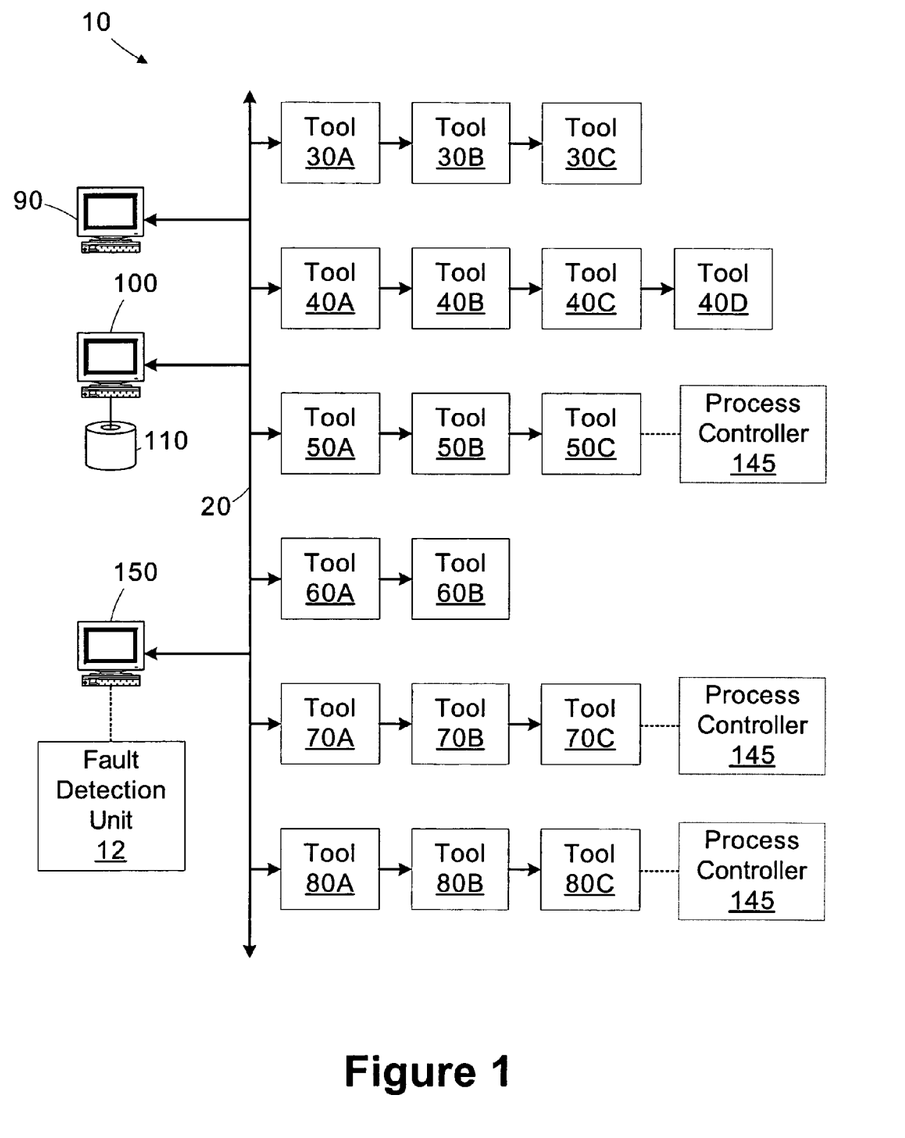
FIG. 1 is a simplified block diagram of a manufacturing system in accordance with one illustrative embodiment of the present invention.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30-80. Each of the tools 30-80 may be coupled to a computer (not shown) for interfacing with the network 20. In the depicted embodiment, the tools 30-80 are grouped into sets of like tools, as denoted by lettered suffixes. For example, the set of tools 30A-30C represent tools of a certain type, such as a chemical mechanical planarization tool. A particular wafer or lot of wafers progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal anneal tools, implantation tools, etc. The tools 30-80 are illustrated in a rank and file grouping for illustrative purposes only. In an actual implementation, the tools 30-80 may be arranged in any physical order or grouping. Additionally, the connections between the tools in a particular grouping are meant to represent connections to the network 20, rather than interconnections between the tools 30-80.

A manufacturing execution system (MES) server or controller 90 directs high level operation of the manufacturing system 10. The MES server 90 may monitor the status of the various entities in the manufacturing system 10 (i.e., lots, tools 30-80) and control the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, operating recipes, etc. The controller 90 may also provide operating recipes to one or more of the tools depicted in FIG. 1. Of course, the controller 90 need not perform all of these functions. Moreover, the functions described for the controller 90 may be performed by one or more computers spread throughout the system 10.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The manufacturing system 10 also includes an illustrative fault detection unit 12 executing on an illustrative workstation or controller 150. The fault detection unit 12 is adapted to perform or control various fault detection routines employed in the manufacturing system 10. For example, the fault detection unit 12 may acquire or access a variety of different types of data acquired regarding the performance or operation of the manufacturing system 10. Based upon an analysis of that data, the fault detection unit or controller 12 may take various actions, such as declare a fault condition has occurred, indicate that a potential fault condition or event may occur, etc. The fault detection unit 12 is also adapted to acquire or access data regarding various processing utilities used by various process tools used within the manufacturing facility 10 as well as environmental data within the manufacturing facility. Based upon this process utility data and/or environmental data, the fault detection unit 12 is adapted to analyze or determine the cause of variations in processing results of different tools even though the tools are performing the same target process operation, as described more fully below.

The particular control models used by the process controllers 145 depend on the type of tool 30-80 being controlled. The control models may be developed empirically using commonly known linear or non-linear techniques. The control models may be relatively simple equation-based models (e.g., linear, exponential, weighted average, etc.) or a more complex model, such as a neural network model, principal component analysis (PCA) model, partial least squares projection to latent structures (PLS) model. The specific implementation of the control models may vary depending on the modeling techniques selected and the process being controlled. The selection and development of the particular control models would be within the ability of one of ordinary skill in the art, and accordingly, the control models are not described in greater detail herein for clarity and to avoid obscuring the instant invention.

An exemplary information exchange and process control framework suitable for use in the manufacturing system 10 is an Advanced Process Control (APC) framework, such as may be implemented using the Catalyst system formerly offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The processing and data storage functions are distributed amongst the different computers or workstations in FIG. 1 to provide general independence and central information storage. Of course, different numbers of computers and different arrangements may be used without departing from the spirit and scope of the instant invention.

Figure 2:
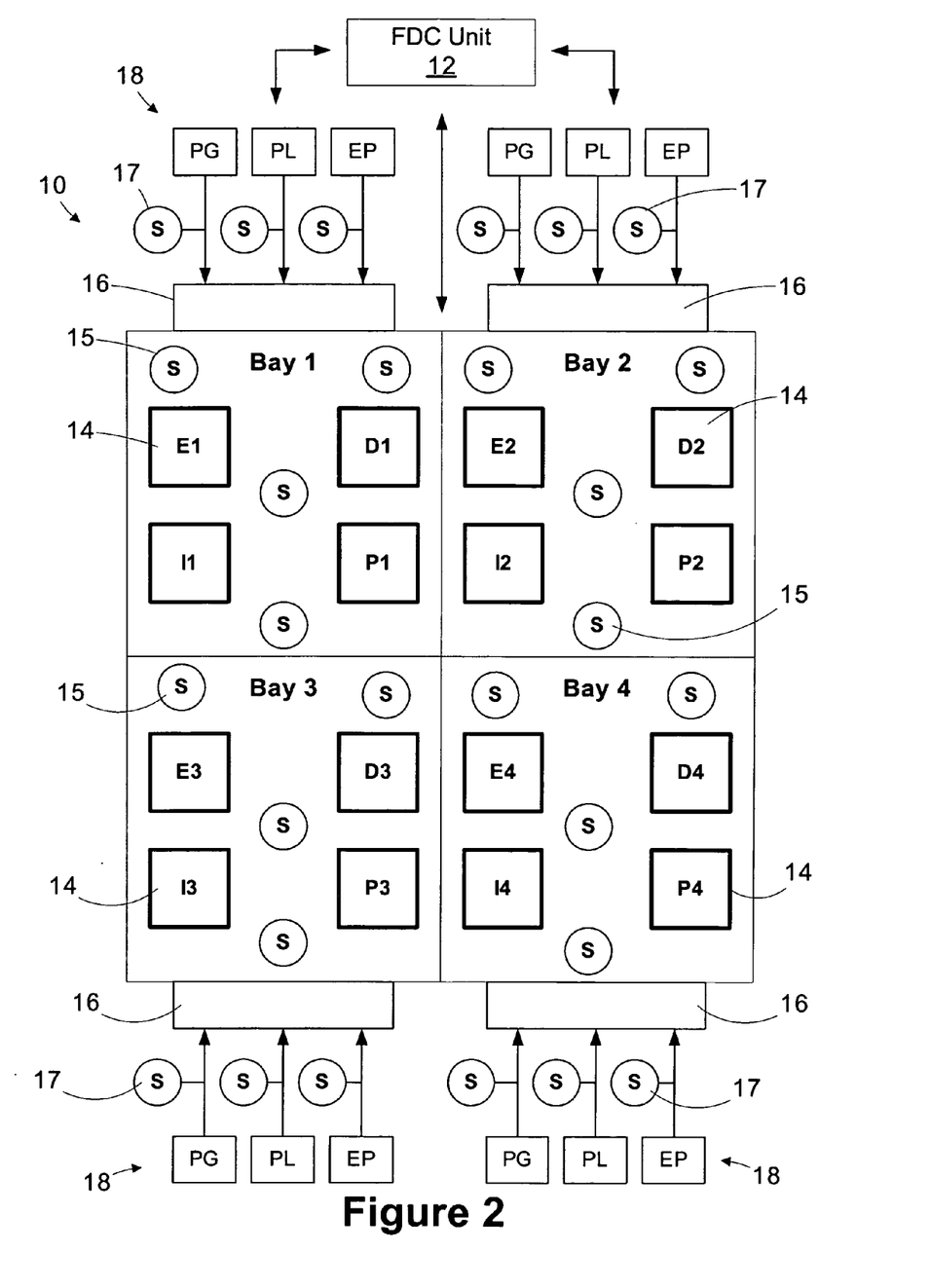
FIG. 2 is a simplified block diagram of a more detailed depiction of a system in accordance with one illustrative embodiment of the present invention.

FIG. 2 is a more specific, simplified block diagram of a manufacturing system 10 in accordance with one illustrative embodiment of the present invention. As shown therein, the illustrative manufacturing system 10 is adapted to manufacture integrated circuit devices on semiconducting substrates. However, as mentioned previously, the present invention is not limited to that particular application. In the illustrative embodiment depicted in FIG. 2, the manufacturing facility 10 is comprised of four illustrative manufacturing bays (Bays 1-4), wherein a variety of process tools 14 are positioned in each of the bays. The size and configuration of the various bays depicted in the illustrative manufacturing facility 10 may vary depending upon the particular facility and the type of products under manufacture. The process tools 14 schematically depicted in FIG. 2 are intended to be illustrative in nature of any type of process tool that may be adapted to perform any type of process operation. Moreover, the number and physical location of the tools 14 in each of the bays may vary depending upon the particular application.

As used herein, the term "process tool" should be understood to be any type of tool capable of performing any type of operation. In the context of a semiconductor manufacturing environment, such process tools 14 may include, but are not limited to, etch tools (E1-E4), deposition tools (D1-D4), ion implant tools (I1-I4), photolithography modules (P1-P4), furnaces, etc. Moreover, as used herein, a "process tool" shall be understood to be a process tool having a single chamber, or a single chamber of a multiple chamber process tool. In the illustrative layout depicted in FIG. 2, each bay (bay 1-4) is comprised of an etch tool (E), a deposition tool (D), an ion implant tool (I) and a photolithography module (P).

In the illustrative embodiment depicted in FIG. 2, each of the bays (1-4) is provided with a distribution unit 16 which controls or regulates various processing utilities 18 that are provided to the tools 14 within each respective bay. The exact composition of the processing utilities 18 may vary depending upon the particular application. For example, such processing utilities may include a variety of process gases (PG), a variety of processing liquids (PL) and electrical power supply (EP), as schematically depicted in FIG. 2. Also depicted in FIG. 2 are a plurality of sensors 17 that are adapted to obtain data regarding the various processing utilities 18 supplied to each of the respective bays. The sensors 17 may be any type of sensor adapted to sense a variety of parameters associated with the processing utilities 18. For example, the sensors 17 may be adapted to sense a flow rate or a composition of one or more process gases or process liquids provided to the distribution unit 16. Similarly, the sensors 17 may be a voltage meter adapted to measure the voltage level of the power supplied to each of the respective bays. Other illustrative examples or processing utilities include, but are not limited to, particle sensors, ultraviolet light, vacuum conditions, etc. Thus, the present invention should not be considered to be limited in any way with respect to the type of processing utilities 18 provided to the manufacturing facility 10, nor to the type of sensors 17 used to obtain data regarding such processing utilities 18.

Also depicted in FIG. 2 are a plurality of sensors 15 within each of the bays (1-4) within the manufacturing facility 10. The sensors 15 are adapted to acquire environmental data, e.g., pressure, temperature, humidity, vibrations, etc., regarding the environment existing within the individual bays (1-4) and/or the facility 10 considered in its entirety.

As schematically depicted in FIG. 2, the fault detection unit 12 is adapted to acquire or access data acquired by the various sensors 15, 17. That is, the fault detection unit 12 may acquire or access data regarding one or more characteristics of the processing utilities and/or environmental data for purposes to be described more fully below. The fault detection unit 12 may also communicate with the various process tools 14. It should be understood that the illustrative layout of the manufacturing facility 10 depicted in FIG. 2 is schematic in nature and by way of example only. In practice, the sensors 17 may be located within the manufacturing facility 10 if desired. Thus, the present invention should not be considered as limited to any particular physical arrangement of process tools, processing utilities or the various sensors described above.

Figure 3:
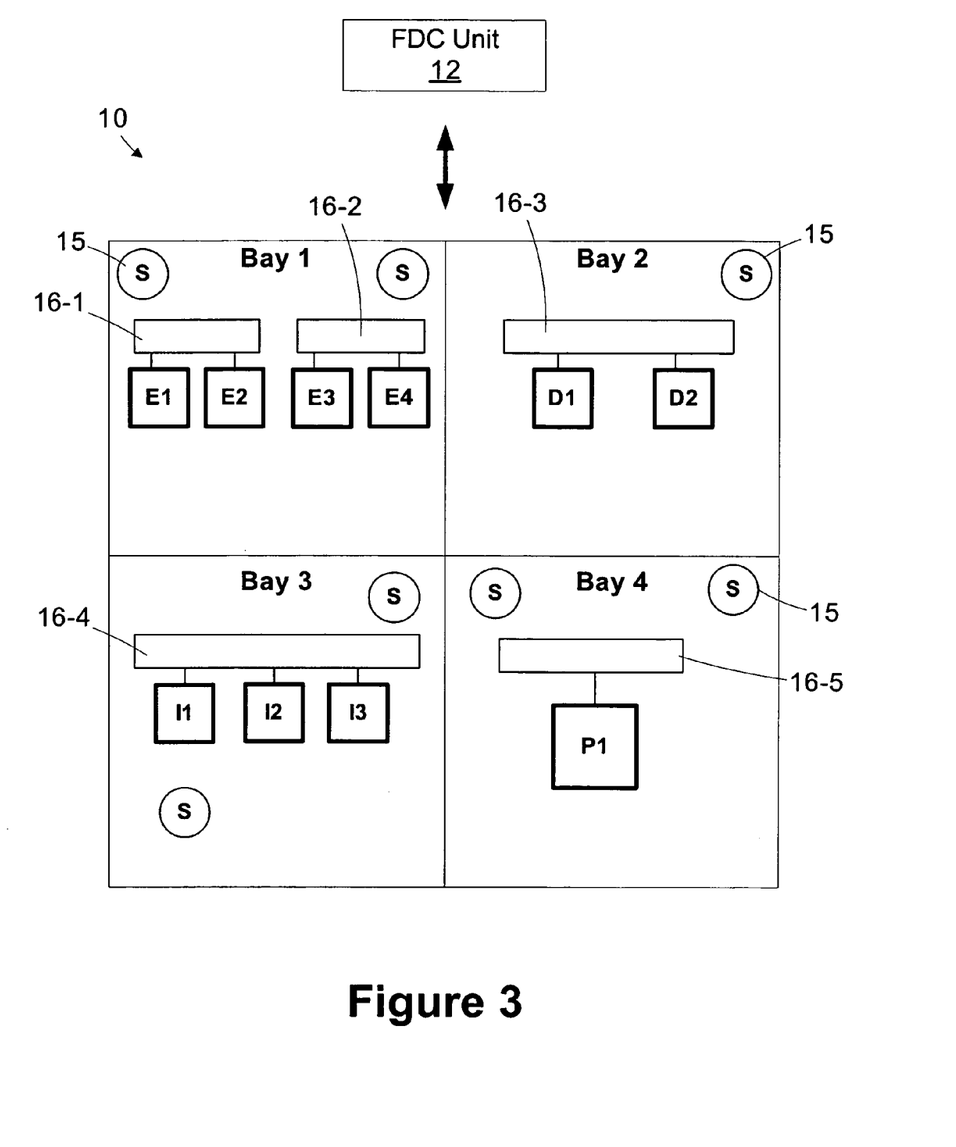
FIG. 3 is another simplified diagram of another embodiment of the present invention.

FIG. 3 provides another illustrative configuration of a manufacturing facility 10 that may be operated in accordance with the present invention. As shown in FIG. 3, each of the bays 1-3 are provided with a plurality of tools 14 that are adapted to perform similar type functions. For example, bay 1 is provided with the etch tools E1-E4, each of which are adapted to perform various etching processes, whereas bay 2 is provided with a plurality of deposition tools D1-D2 that are adapted to perform various deposition processes. Three ion implant tools (I1-I3) are positioned in bay 3. A single photolithography module (P1) is provided in bay 4.

In the embodiment depicted in FIG. 3, the etch tools E1, E2 are operatively coupled to a distribution unit 16-1, whereas the etch tools E3, E4 are operatively coupled to a distribution unit 16-2. The various processing utilities that may be provided to the various distribution units depicted in FIG. 3 are not shown so as to not obscure the present invention. In general, such processing utilities may include various process gases (PG), process liquids (PL) and electrical power (EP) similar in nature to the illustrative processing utilities 18 depicted in FIG. 2. The processing utilities for the etch tools E1, E2 may be quantitatively or qualitatively different than the processing utilities provided to the etch tools E3, E4 in the depicted embodiment. In bay 2, a single distribution unit 16-3 controls the flow of processing utilities to the deposition tools D1-D2. In bay 3, a single distribution unit 16-4 controls the distribution of processing utilities to the plurality of ion implant tools I1-I3. In bay 4, a single photolithography module P1 is provided and it receives processing utilities via the distribution unit 16-5. A plurality of environmental sensors 15 are also positioned throughout the various bays (1-4) of the manufacturing facility 10.

Initially, processing operations are performed until it is determined that a plurality of the process tools 14 are producing unacceptable processing results when performing the same process operation. This conclusion may be reached based upon an analysis of various metrology data collected after the process operations have been performed. This determination may be based upon the processing of production wafers through the process tools 14 and/or by processing one or more test wafers through the various tools 14.

In accordance with one aspect of the present invention, once it is determined that there is a mismatch between the results produced by one or more of the process tools 14 within the system, the fault detection unit 12 may acquire or access data acquired by the process utility sensors 17 and/or the environmental data sensors 15 to determine the cause of the variations in processing results of the plurality of tools 14 within the manufacturing facility 10. Considered collectively, the data regarding the various processing utilities and the data regarding the environmental data acquired by the sensors 15 will be referred to as "support facility data." By analyzing the support facility data, the fault detection unit or controller 12 may be able to determine the cause of the processing variations by various tools 14 within the manufacturing facility 10. For example, by analyzing the support facility data acquired by the various sensors 15, 17, the fault detection unit 12 may be able to readily determine that any processing variations between two processing tools 14 is not the result of a variation in the processing utilities 18 supplied to the various tools 14 and/or not due to differing environmental conditions. In such a situation, the fault detection unit 12 may be able to more quickly and readily focus fault detection analysis on other operational aspects of the mismatched tools 14 thereby reducing the time associated with troubleshooting mismatched processing tools 14.

In another illustrative example, based on the support facility data acquired by the sensors 17 and/or the environmental sensors 15, the fault detection unit 12 may be able to identify that the processing utilities and/or the environmental conditions within the manufacturing facility 10 are a likely source of the variation in processing results of the conflicting tools. For example, if the tool state data associated with two illustrative deposition tools indicate that the deposition tools should be producing similar results, the fault detection unit 12 may analyze the support facility data and determine that the processing utilities 18 provided to the first deposition tool are of a different quantity or quality as compared to the processing utilities 18 provided to the second deposition tool, thereby providing a possible explanation as to the cause or source of the variations in the processing results produced by the two deposition tools.

Thus, in accordance with the methodologies described herein, the fault detection unit 12 may be able to analyze support facility data, e.g., processing utilities data and/or environmental data, to isolate the cause of problems associated with mismatched processing tools. Accordingly, manufacturing efficiencies may be enhanced as a result of this additional capability.

Figure 4:
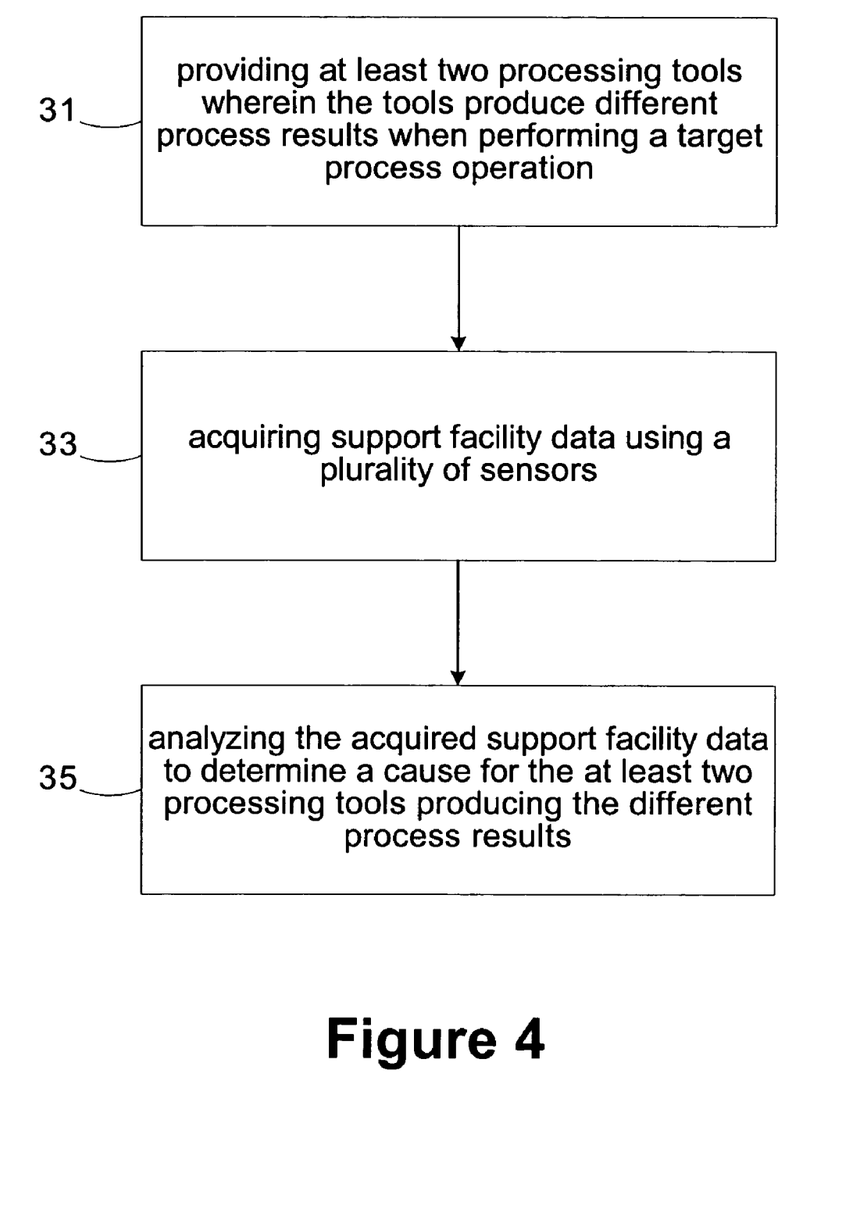
FIG. 4 is a simplified flow diagram of a method in accordance with one illustrative embodiment of the present invention.

The present invention is generally directed to various methods and systems for analyzing process equipment processing variations using sensor data. One illustrative embodiment of the present invention is depicted in flowchart form in FIG. 4. As shown therein, the method comprises providing at least two processing tools wherein the tools produce different process results when performing a target process operation, as indicated in block 31, acquiring support facility data using a plurality of sensors, as recited in block 33, and analyzing the acquired support facility data to determine a cause for the processing tools producing different process results, as set forth in block 35. In further embodiments, the method comprises processing additional workpieces, e.g., wafers, through one or more of the process tools 14 after such analysis is performed.

In another illustrative embodiment, the method comprises providing at least two processing tools wherein the tools produce different process results when performing a target process operation, acquiring support facility data using a plurality of sensors, and providing a controller that accesses the acquired support facility data and analyzes the acquired support facility data to determine a cause for the processing tools producing different process results. As with the previous embodiment, additional wafers may be processed in one or more of the tools 14 after such an analysis has been completed.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   processing at least two wafers, each wafer being processed in a different one of at least two process tools at different locations in at least one manufacturing bay, each process tool configured to perform the same target process operation that is selected so that the process results are expected to be the same for each of said at least two wafers;
   determining whether said process tools produce different process results on said at least two wafers when performing the target process operation;
   acquiring support facility data using a plurality of sensors located in said at least one manufacturing bay in response to determining that said at least two process tools produced different results on said at least two wafers when performing the same target process operation; and
   performing fault detection analysis using a controller to determine a cause for said at least two process tools producing said different process results, said fault detection analysis including analyzing said acquired support facility data.

2. The method of claim 1, wherein said process tools comprise at least one of a deposition tool, an etch tool, an ion implant tool, and a furnace.

3. The method of claim 1, wherein said target process operation is a target deposition process operation.

4. The method of claim 1, wherein said target process operation is a target etch process operation.

5. The method of claim 1, wherein said support facility data comprises at least one of environmental data and processing utilities data associated with said at least one manufacturing bay.

6. The method of claim 5, wherein said environmental data comprises at least one of pressure, temperature and humidity in said at least one manufacturing bay.

7. The method of claim 6, wherein determining said process utilities data comprises at least one of a process gas, flow rate, a process gas composition, and a power supply voltage.

8. The method of claim 1, wherein said support facility data is acquired using a controller.

9. The method of claim 1, wherein performing fault detection analysis using said controller to determine a cause for said at least two process tools producing said different process results comprises performing fault detection analysis using said controller to determine that processing utilities supplied to said at least two process tools is not a cause of said process tools producing said different process results.

10. The method of claim 1, wherein performing fault detection analysis using said controller to determine a cause for said at least two process tools producing said different process results comprises performing fault detection analysis using said controller to determine that processing utilities supplied to at least one of said at least two process tools is a cause of said process tools producing said different process results.

11. The method of claim 1, wherein said at least two process tools are in different sections of a manufacturing facility.

12. The method of claim 1, further comprising processing additional workpieces in said at least two process tools after performing fault detection analysis using said controller.

13. A method, comprising:

processing at least two wafers, each wafer being processed in a different one of at least two process tools at different locations in at least one manufacturing bay, each process tool configured to perform the same target process operation that is selected so that the process results are expected to be the same for each of said at least two wafers;

determining whether said process tools produce different process results on said at least two wafers when performing the target process operation;

acquiring support facility data using a plurality of sensors located in said at least one manufacturing bay in response to determining that said at least two process tools produced different results on said at least two wafers when performing the same target process operation; and providing a controller that:

accesses said acquired support facility data; and performs fault detection analysis using said controller to determine a cause for said at least two process tools producing said different process results, said fault detection analysis including analyzing said acquired support facility data.

14. The method of claim 13, wherein said process tools comprise at least one of a deposition tool, an etch tool, an ion implant tool, and a furnace.

15. The method of claim 13, wherein said target process operation is a target deposition process operation.

16. The method of claim 13, wherein said target process operation is a target etch process operation.

17. The method of claim 13, wherein said support facility data comprises at least one of environmental data and processing utilities data associated with said at least one manufacturing bay.

18. The method of claim 17, wherein said environmental data comprises at least one of pressure, temperature and humidity in said at least one manufacturing bay.

19. The method of claim 17, wherein said process utilities data comprises at least one of a process gas, flow rate, a process gas composition, and a power supply voltage.

20. The method of claim 13, wherein performing fault detection analysis using said controller to determine a cause for said at least two process tools producing said different process results comprises performing fault detection analysis using said controller to determine that processing utilities supplied to said at least two process tools is not a cause of said process tools producing said different process results.

21. The method of claim 13, wherein performing fault detection analysis using said controller to determine a cause for said at least two process tools producing said different process results comprises performing fault detection analysis using said controller to determine that processing utilities supplied to at least one of said at least two process tools is a cause of said process tools producing said different process results.

22. The method of claim 13, wherein said at least two process tools are in different manufacturing bays.

23. The method of claim 13, further comprising processing additional workpieces in said at least two process tools after performing fault detection analysis using said controller.

* * * * *